(12) United States Patent
Choi et al.

(10) Patent No.: US 8,801,570 B2
(45) Date of Patent: Aug. 12, 2014

(54) IGNITION CONTROL TYPE AUTO LEVER DEVICE

(75) Inventors: Jeehyuck Choi, Hwaseong-si (KR);
Yangrae Cho, Hwaseong-si (KR);
Chunnyung Heo, Gyeongsan-si (KR);
Kwanggi Lee, Daegu (KR)

(73) Assignees: Hyundai Motor Company, Seoul (KR);
Kia Motors Corporation, Seoul (KR);
SL Corporation, Dae-Gu (KR)

( * ) Notice: Subject to any disclaimer, the term of this patent is extended or adjusted under 35 U.S.C. 154(b) by 361 days.

(21) Appl. No.: 13/288,374

(22) Filed: Nov. 3, 2011

(65) Prior Publication Data
US 2012/0316030 A1    Dec. 13, 2012

(30) Foreign Application Priority Data

Jun. 9, 2011    (KR) .......................... 10-2011-0055628

(51) Int. Cl.
*F16H 59/74*    (2006.01)

(52) U.S. Cl.
USPC .......................................................... 477/99

(58) Field of Classification Search
USPC .................... 477/99, 111; 74/473.21, 473.24, 74/473.26, 473.3, 473.33
See application file for complete search history.

(56) References Cited

U.S. PATENT DOCUMENTS

| | | | | |
|---|---|---|---|---|
| 5,996,763 A | * | 12/1999 | Tsuge | 192/220.3 |
| 6,508,090 B1 | | 1/2003 | Hasegawa et al. | |
| 8,176,760 B2 | * | 5/2012 | Chung | 70/252 |
| 2010/0057332 A1 | * | 3/2010 | Katoh et al. | 701/113 |
| 2012/0059541 A1 | * | 3/2012 | Chiba | 701/22 |

FOREIGN PATENT DOCUMENTS

| | | |
|---|---|---|
| JP | 10-071870 A | 3/1998 |
| JP | 2002-178795 A | 6/2002 |
| JP | 2008-001317 A | 1/2008 |
| KR | 10-0649164 B1 | 11/2006 |
| KR | 10-0690035 B1 | 3/2007 |

* cited by examiner

*Primary Examiner* — Justin Holmes
(74) *Attorney, Agent, or Firm* — Morgan, Lewis & Bockius LLP

(57) ABSTRACT

An ignition control type auto lever device may disclose shift mode control signals for P(parking)-R(rear)-N(neutral)-D (drive) that are generated by movement of an auto lever according to a gate pattern, another mode control signal that is generated by movement of the auto lever to a section behind the D(drive), and electric signals generated by at least one or more different operations of the auto lever at a section positioned ahead of the P(parking) position that are sent to a PIC (Personal Identification Card) system.

16 Claims, 21 Drawing Sheets

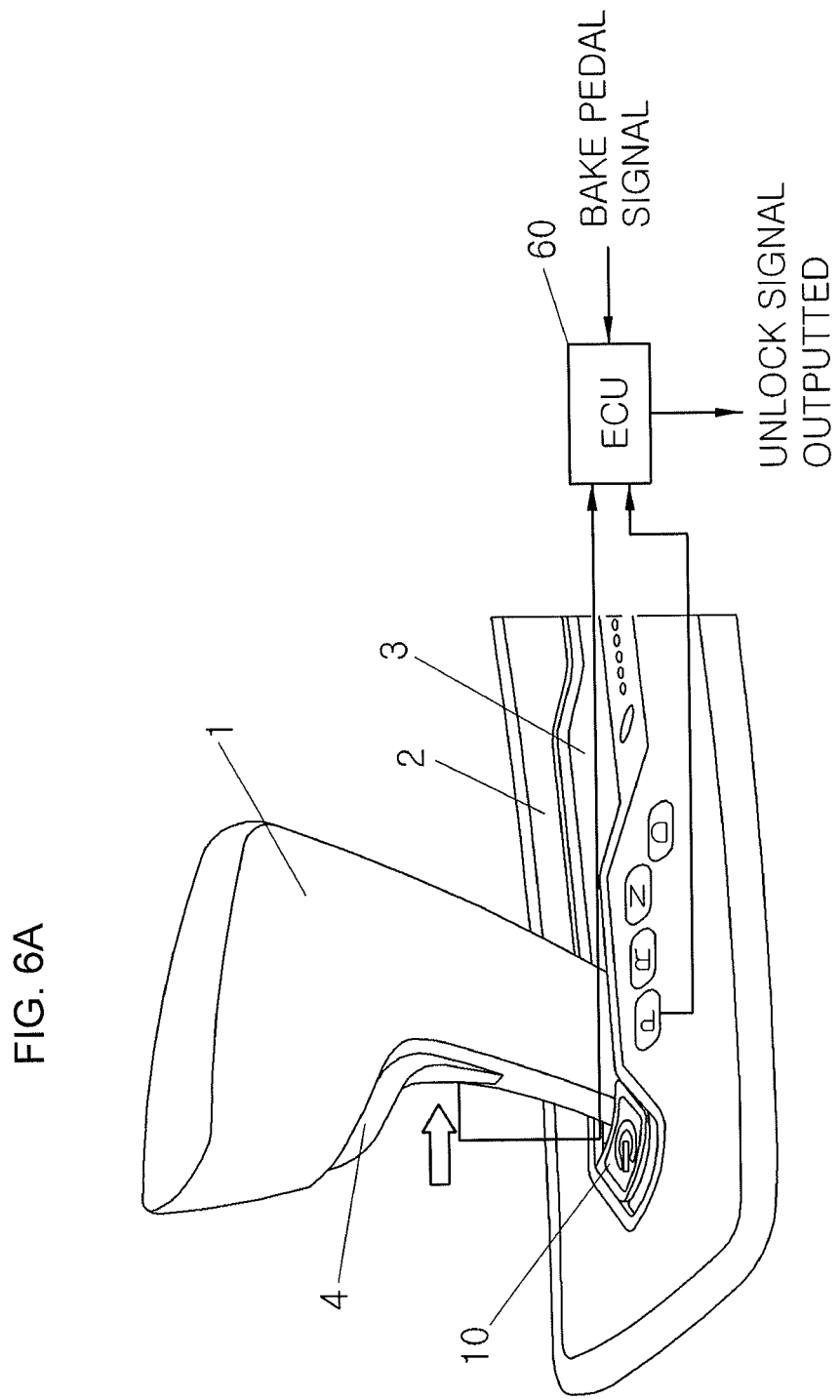

FIG.7A

| CASE | VEHICLE STATE | SHIFT RANGE POSITION | BRAKE PEDAL | SAFETY BUTTON | START BUTTON STANDBY STATE | START BUTTON OPERATION(OPERATION SWITCH) | RESULT |
|---|---|---|---|---|---|---|---|
| IN ENGINE START ON | STOPPED | P | PRESSED DOWN | BUTTON PRESSED | ENGINE START OFF | SHIFT LEVER PUSHED (SWITCH#2) | ENGINE START ON |
| | | | | — | | BUTTON PRESSED (SWITCH #1) | ENGINE START ON |
| | | N | PRESSED DOWN | — | ENGINE START OFF | BUTTON PRESSED (SWITCH #1) | ENGINE START ON |

FIG.8A

| CASE | VEHICLE STATE | SHIFT RANGE POSITION | BRAKE PEDAL | SAFETY BUTTON | START BUTTON STANDBY STATE | START BUTTON OPERATION(OPERATION SWITCH) | RESULT |
|---|---|---|---|---|---|---|---|
| IN ENGINE START ON | STOPPED | P | PRESSED DOWN | BUTTON PRESSED | ENGINE START OFF | SHIFT LEVER PUSHED (SWITCH#2) | ENGINE START ON |
| | | P | PRESSED DOWN | — | ENGINE START OFF | BUTTON PRESSED (SWITCH #1) | ENGINE START ON |
| | | N | PRESSED DOWN | — | ENGINE START OFF | BUTTON PRESSED (SWITCH #1) | ENGINE START ON |

FIG.11

| CASE | VEHICLE STATE | SHIFT RANGE POSITION | BRAKE PEDAL | SAFETY BUTTON | START BUTTON STANDBY STATE | START BUTTON OPERATION(OPERATION SWITCH) | RESULT |
|---|---|---|---|---|---|---|---|
| IN ENGINE START ON | STOPPED OR UNDER PREDETERMINED SPEED | P | NOT PRESSED DOWN | BUTTON PRESSED | ENGINE START ON | SHIFT LEVER PUSHED (SWITCH#2) | ENGINE START OFF |
| | | D/R/N | NOT PRESSED DOWN | — | ENGINE START ON | BUTTON PRESSED (SWITCH #1) | ACC |

| CASE | VEHICLE STATE | SHIFT RANGE POSITION | BRAKE PEDAL | SAFETY BUTTON | START BUTTON STANDBY STATE | START BUTTON OPERATION(OPERATION SWITCH) | RESULT |
|---|---|---|---|---|---|---|---|
| IN POWER ON | STOPPED | P | NOT PRESSED DOWN | BUTTON PRESSED | POWER OFF | SHIFT LEVER PUSHED (SWITCH #2) | OFF > ACC > ON > OFF |
| | | | | | | BUTTON PRESSED (SWITCH #1) | OFF > ACC > ON > OFF |
| | | D/R/N | NOT PRESSED DOWN | — | POWER OFF | BUTTON PRESSED (SWITCH #1) | ACC |
| IN POWER ON | STOPPED OR UNDER PREDETERMINED SPEED | P | NOT PRESSED DOWN | BUTTON PRESSED | POWER ON | SHIFT LEVER PUSHED (SWITCH #2) | OFF |
| | | | | | | BUTTON PRESSED (SWITCH #1) | OFF |
| | | D/R/N | NOT PRESSED DOWN | — | POWER ON | BUTTON PRESSED (SWITCH #1) | ACC |

IGNITION CONTROL TYPE AUTO LEVER DEVICE

CROSS-REFERENCE TO RELATED APPLICATIONS

The present application claims priority to Korean Patent Application Number 10-2011-0055628 filed Jun. 9, 2011, the entire contents of which application is incorporated herein for all purposes by this reference.

BACKGROUND OF THE INVENTION

1. Field of the Invention

The present invention relates to an auto lever device for shifting control, and more particularly, to an auto lever device that can turn on/off the start of an engine by a simple pressing operation of a driver or a minimum position change of an auto lever while providing a shifting mode control as a basic function.

2. Description of Related Art

In general, vehicles are provided with a safety function that allows starting the engine only by operating the brake pedal, with the shift lever at the P(parking)-range, in order to prevent abnormal rapid departure when starting the vehicles.

Further, when a vehicle is equipped with a PIC (Personal Identification Card) system, which is called a smart key, the engine can be started only when the driver is identified, such that an anti-theft function can be intensified.

FIG. 12 shows an example of the PIC system.

As shown in FIG. 12, the PIC system includes a fob key 100 that is a wireless operation key storing the information on a driver, a immobilizer unit 600 that determines whether to start by communicating with fob key 100, a PIC unit 500 (Personal Identification Card Unit) that switches starting/steering-possible state into a possible state, and a BCM 900 (Body Control Module) that provides whether start is permitted to an ECU 700 (Electronic Control Unit) in response to a signal from PIC unit 500.

However, in the PIC system, BCM 900 is provided with a function of sensing that the brake pedal is pressed and an individual start button for starting is disposed, such that the driver feels more uncomfortable against reinforcement of the safety function.

For example, in order to start a vehicle, when a driver presses down the brake pedal after inserting his/her fob key 100 or placing it in place such that BCM 900 recognizes it, changes the shift lever to the P (parking)-range, and presses the start button, start becomes possible by wireless communication through fob key 100.

In order to stop the engine, the driver presses down the brake pedal such that BCM 900 recognizes it and changes the shift lever to the P (parking)-range, and then presses the start button, thereby stopping the engine.

In order to start or stop the engine, as described above, the driver has to operate the individual start button every time, in addition to changing the shift lever to the P (parking)-range, such that the driver necessarily feels uncomfortable in acting.

Meanwhile, when a vehicle is equipped with a shift by wire type shifting system, an actuator, an electronic shift lever, and a controller (TCU or ECU) are disposed between the transmission and the shift lever, for an electronic configuration, instead of a mechanical connection structure.

Even in the SBW, the driver implements desired shift range control by changing the position of an electronic shift lever along a gate pattern, but the position change of the shift lever is converted into an electric signal, such that various addition functions are more easily implemented.

Therefore, when a vehicle equipped with the PIC system is also equipped with an SBW type shift system, it is possible to improve convenience in various ways, using mechanical combination of the PIC system and the SBW type shift system, and particularly, it is possible to more simplify the start procedure while keeping the safety function when starting an engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an ignition control type auto lever device that can make the implementing function of an SBW (Shift By Wire) type shifting system more various and considerably increase applicability by implementing an engine start-of/off function of a PIC (Personal Identification Card) system, using an SBW type auto lever.

Further, various aspects of the present invention are directed to providing an ignition control type auto lever device that can make an engine start-on/off operation of the PIC system more convenient by implementing engine start-on/off of the PIC system with a simple pressing operation or the minimum position change of the auto lever by a driver.

In addition, various aspects of the present invention are directed to providing an ignition control type auto lever device that can considerably improve convenience by implementing power-on/off of a vehicle simultaneously with an engine start-on/off operation, with a simple pressing operation or the minimum position change of the auto lever by a driver.

In an aspect of the present invention, an ignition control type auto lever device may be disclosed, wherein shift mode control signals for P(parking)-R(rear)-N(neutral)-D(drive) may be generated by movement of an auto lever according to a gate pattern, wherein another mode control signal may be generated by movement of the auto lever to a section behind the D(drive), and wherein electric signals generated by at least one or more different operations of the auto lever at a section positioned ahead of the P(parking) position may be sent to a PIC (Personal Identification Card) system.

The electric signals may be an engine start-on/off electric signal and a vehicle power-on/off electric signal.

The electric signals may be generated by a driver moving forward the auto lever ahead of the P(parking) position or directly pressing the portion around the gate pattern at the section positioned ahead of the P(parking).

The electric signals may be an engine start-on/off electric signal and a vehicle power-on/off electric signal.

The ignition control type auto lever device may include a first start button that may be exposed to the outside of an indicating panel provided with the gate pattern and disposed around the gate pattern at the section positioned ahead of the P(parking), wherein a first electrical signal may be generated by the first start button when the driver presses the first start button, and a second start button that may be disposed inside the indicating panel in order not to be exposed to the outside wherein a second electrical signal may be generated by the second start button when the auto lever actuates the second start button.

The first and second electric signals may be an engine start-on/off electric signal or a vehicle power-on/off electric signal.

The first start button may include a Printed Circuit Board (PCB) panel and a contact switch electrically connected to the PCB panel, a button that selectively moves down about a hinge shaft coupled to the indicating panel when pressed down and receives an elastic restoring force from a torsional spring wound around the hinge shaft so as to selectively contact with the contact switch of the PCB panel and generate the first electric signal when pressed by the button that may have moved down, and a guider slidably coupled to an open slot formed to the button and guiding a forward-backward movement of the button when the button may be pushed by the driver, wherein a return spring may be disposed between the guider and the button in the open slot to provide an elastic restoring force for return, to the button and the auto lever, wherein the second start button may include a contact switch, a PCB panel disposed inside the indicating panel and having the contact switch that protrudes toward the auto lever and generates the second electric signal when pressed by the auto lever, and wherein the auto lever has a safety locker and a shift locker that restrain the forward-backward movement of the auto lever at the P(parking) position at the portion of the auto lever coupled to a lever moving shaft that guides the forward-backward movement of the auto lever, a safety button that sends an unlock signal to the safety locker and the shift locker restraining movement toward the section positioned ahead of the P(parking), and a lever protrusion formed to the auto lever and installed to press the contact switch of the second start button when the auto lever moves ahead of the P(parking).

The safety locker and the shift locker may include solenoids that may be operated in response to signals of the safety button, and the solenoid of the safety locker may have a locking lever that locks/unlocks a locking protrusion that protrudes from an outer surface of the auto lever coupled with the lever movement shaft, and the solenoid of the shift locker may have a locking lever disposed in front of the auto lever to selectively allow the movement of the auto lever forward from the P (parking) position thereof.

The first start button may include a Printed Circuit Board (PCB) panel and a contact switch electrically connected to the PCB panel, a button that selectively moves down about a hinge shaft coupled to the indicating panel when pressed down and receives an elastic restoring force from a spring disposed between the PCB panel and the button so that the pressed button of the first start button receives an elastic restoring force from the spring elastically and vertically supporting the portion between the PCB panel and the button, a guider slidably coupled to an open slot formed to the button and guiding a forward-backward movement of the button when the button may be pushed by the driver, wherein a return spring may be disposed between the guider and the button in the open slot to provide an elastic restoring force for return, to the button and the auto lever, wherein the second start button may include a contact switch that generates a second electric signal, using a sensor that senses the distance from the auto lever.

The first button may be integrated with the second start button by the PCB panel of the first start button.

The first start button may be exposed to the outside of the indicating panel at a position where the first start button first comes in contact with the auto lever before the second start button comes in contact with the auto lever when the auto lever moves toward the first start button.

Continuous generation of the first and second electric signals of the first start button and the second start button may be discriminated by counting in the PIC system.

Conditions for recognizing the first and second electric signals of the first start button and the second start button in the PIC system may be an engine start-on condition when a vehicle stops, the auto lever may be positioned at the P(parking) or the N(neutral), and a brake pedal may be pressed down, wherein conditions for recognizing the first and second electric signals of the first start button and the second start button in the PIC system may be an engine start-off condition when the vehicle stops or travels under a predetermined speed, the auto lever may be positioned at the P(parking) or the D(drive)/R(rear)IN(neutral), and the brake pedal may not be pressed down.

Conditions for recognizing the first and second electric signals of the first start button and the second start button in the PIC system may be a vehicle power-on condition when a vehicle stops, the brake pedal may not be pressed down, and the auto lever may be placed at the P(parking) position or the D(drive)/R(rear)/N(neutral) positions, wherein conditions for recognizing the first and second electric signals of the first start button and the second start button in the PIC system may be a vehicle power-off state when the vehicle stops or travels under a predetermined speed, the brake pedal may not be pressed down, and the auto lever may be placed at the P(parking) position or the D(drive)/R(rear)/N(neutral) positions.

According to exemplary embodiments of the present invention, it is possible to keep the advantages of a PIC system because the PIC system operates in connection with an auto lever for shift range control and make the functions provided by an SBW type shift system more various, in addition to considerably improving the operational convenience of engine start-on/off for the driver.

Further, it is possible to minimize the driver's action because the engine start-on/off operations can be performed within a range where the driver's intuitive action line is ensured, such as pressing with a finger or pushing the auto lever.

In addition, it is also possible to further improve the convenience because the engine start-on/off operation provides selective possibility for the driver, such as pushing a button or contact due to movement of the auto lever.

Moreover, it is also possible to considerably improve convenience by implementing power-on/off of a vehicle simultaneously with an engine start-on/off operation, with a simple pressing operation or the minimum position change of the auto lever by a driver.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6A and FIG. 6B illustrate an initial operation of an auto lever device for starting an engine according to an exemplary embodiment of the present invention.

FIG. 7A, FIG. 7B and FIG. 7C illustrate an operation showing when an engine is started by pressing the first start button when engine start conditions according to an exemplary embodiment of the present invention are satisfied.

FIG. 8A, FIG. 8B and FIG. 8C illustrate an operation views showing when an engine is started by using a second start button, by pushing an auto lever ahead of the P (parking)-range when the engine start conditions are satisfied.

FIG. 11 is a view showing control of engine start-off and vehicle power-on/off which can be implemented by the first start button and the second start button provided in the auto lever device according to an exemplary embodiment of the present invention.

Figure 1A:
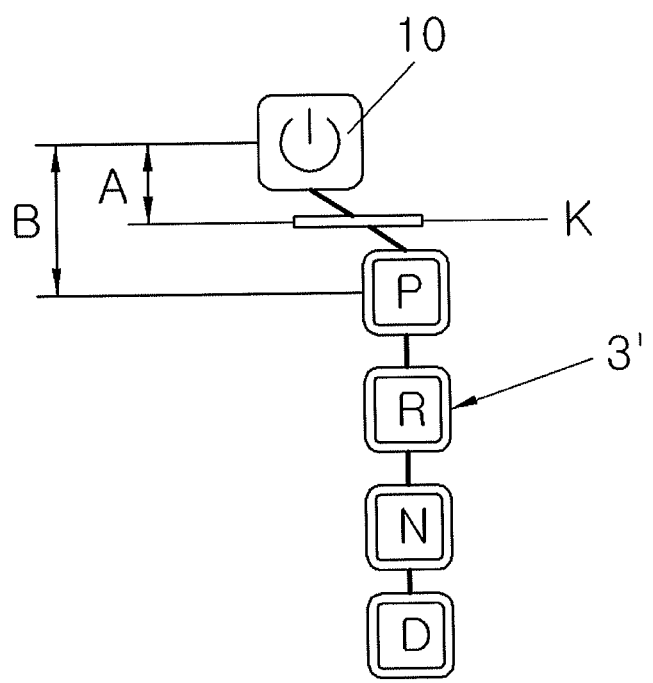
FIG. 1A and FIG. 1B are views showing the entire configuration of an ignition control type auto lever device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter in detail with reference to the accompanying drawings, and the exemplary embodiments can be achieved in various ways by those skilled in the art and the present invention is not limited to the exemplary embodiments.

Figure 1B:
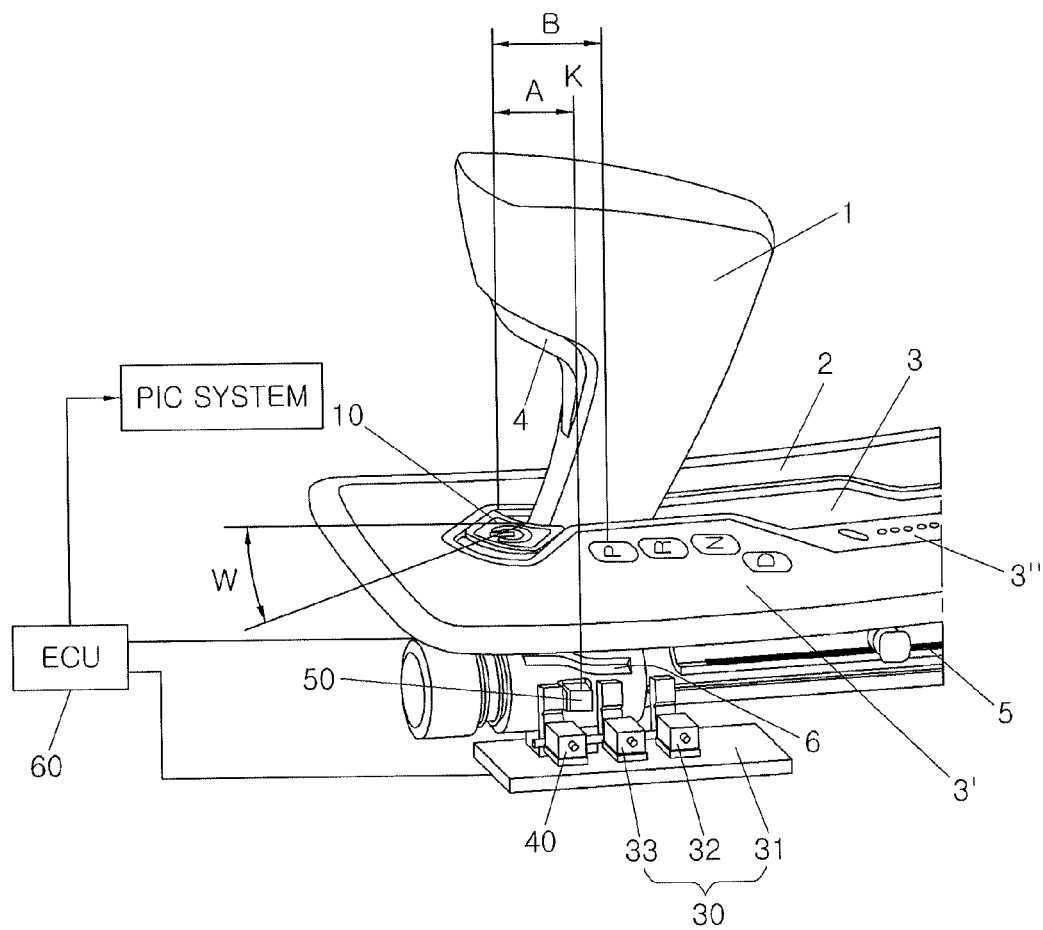

FIG. 1 is a view showing the entire configuration of an ignition control type auto lever device according to an exemplary embodiment of the present invention.

As shown in FIG. 1, an auto lever device includes an auto lever 1 that can be held and moved by a hand and has a safety button 4 that is pressed by a finger, an indicating panel 2 that has a gate pattern basically implementing a shift mode 3' controlled by movement of auto lever and additionally implementing an additional mode 3", which is another control mode, a lever moving shaft 5 where the lower portion of auto lever 1 is coupled and guides forward-backward movement of auto lever 1, and a start control unit that allows auto lever 1 to move ahead of shift mode 3' and sends electric signals generated by at least one or more different operations to a PIC (Personal Identification Card) system.

Shift mode 3' is a shift range, such as P(parking)-R(rear)-N(neutral)-D(drive) and additional mode 3" is a manual shift mode, such as +/−M mode or an eco mode generating signals to control a steering system or a suspension system.

The start control unit includes at least one or more start buttons that generates engine start-on/off signals or vehicle power-on/off signals by using different operations, a locking unit that unlocks auto lever 1 by an ECU 60 when safety button 4 is pressed, and ECU 60 that receives the information on the vehicle states and discriminates and sends at least one or more electric signals of the start buttons to the PIC system.

The start button includes a first start button 10 that generates an electric signal when exposed to indicating panel 2 and pressed by a hand and a second start button 20 (see FIG. 3) that is disposed inside indicating panel 2 and generates an electric signal when coming in contact with auto lever 1.

The locking unit includes a safety locker 30 that allows auto lever 1 to move from the P(parking) position by unlocking auto lever 1 when safety button 4 is pressed and a shift locker 40 disposed ahead of safety locker 30.

Shift locker 40 allows auto lever 1 to move ahead the P(parking) position by unlocking auto lever 1.

In the exemplary embodiment, first start button 10 is positioned at a predetermined gap from auto lever 1 with respect to a shift lock position K where auto lever 1 is locked by shift locker 40.

First start button 10 is assembled to have a position angle W, inclining to a side with respect to a straight movement path of auto lever 1.

Accordingly, first start button 10 is positioned close to auto lever within a range of ensuring the driver's intuitive action line and does not interfere with movement of auto lever 1 that moves forward to second start button 20.

First start button 10 is positioned at a predetermined distance B from the P(parking) position behind shift lock position K.

Therefore, it is possible to strengthen safety without generating an electric signal even if first start button 10 is operated by mistake, with the engine start-on/off conditions or the vehicle power-on/off conditions not satisfied.

The vehicle should be in a stop state, auto lever 1 should be at the P(parking) or N(neutral) position, and the brake pedal should be pressed in order to satisfy the engine start-on conditions.

In this state, first start button 10 or second start button 20 is selected in accordance with whether to operate safety button 4 unlocking safety locker 30 and shift locker 40, which restrain auto lever 1.

The vehicle should be in the stop state or travels under a predetermined speed and auto lever 1 should be at the P(parking) or D(drive)/R(rear)/N(neutral) position to satisfy the engine start-off conditions.

In this state, first start button 10 or second start button 20 is selected in accordance with whether to operate safety button 4 unlocking safety locker 30 and shift locker 40, which restrain auto lever 1.

The vehicle should be in the stop state or travel under a predetermined speed and the brake pedal should not be pressed to satisfy the vehicle power-on/off conditions.

In this state, first start button 10 or second start button 20 is selected in accordance with whether to operate safety button 4 unlocking safety locker 30 and shift locker 40, which restrain auto lever 1.

Figure 2A:
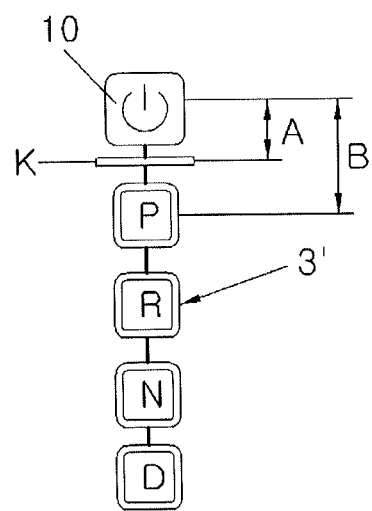
FIG. 2A and FIG. 2B are views showing the configuration a gate pattern of the ignition control type auto lever device according to an exemplary embodiment of the present invention.
Figure 2B:
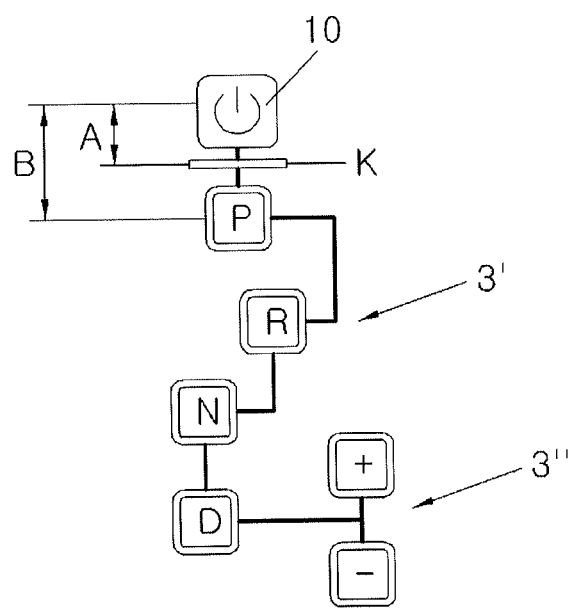

FIG. 2 is a modification of gate pattern 3 according to an exemplary embodiment of the present invention, in which FIG. 2A shows an example when first start button 10 is arranged in a straight line ahead of shift mode 3' of the P(parking)-R(rear)-N(neutral)-D(drive) and FIG. 2B shows when first start button 10 is arranged in a straight line ahead of shift mode 3' of the P(parking)-R(rear)-N(neutral)-D(drive) while additional mode 3" is further arranged behind shift mode 3'.

In this configuration, as described above, additional mode 3" implies the +/−M mode, which is a manual transmission mode, or the eco mode generating a signal for controlling the steering system or the suspension system in the SBW (Shift By Wire) type transmission system.

Figure 3:
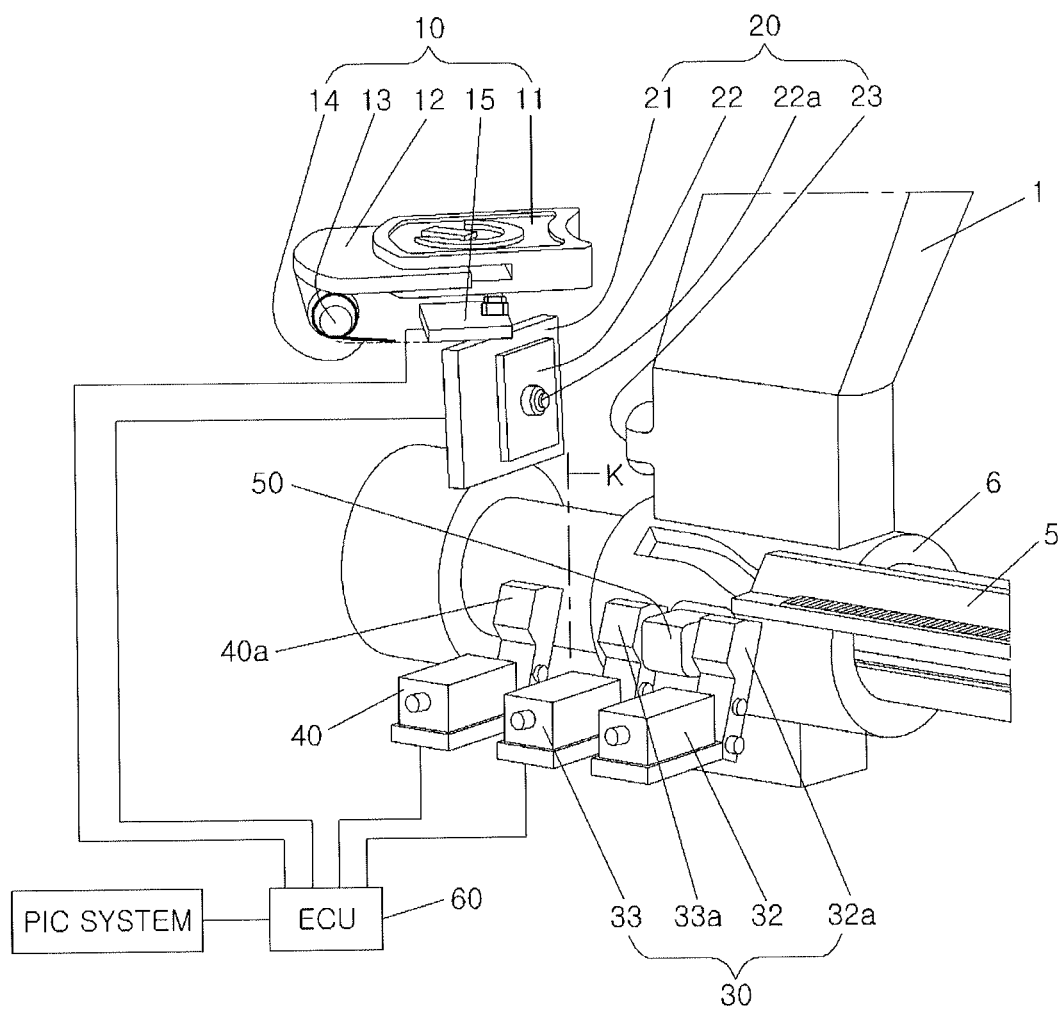
FIG. 3 is a view showing the internal configuration of an ignition control type auto lever device according to an exemplary embodiment of the present invention.

FIG. 3 is a view showing the internal configuration of an ignition control type auto lever device according to an exemplary embodiment of the present invention.

As shown in FIG. 3, in the auto lever device, auto lever 1 coupled to lever moving shaft 5 by a hollow coupling end 6 formed at the end is pushed forward or backward on lever moving shaft 5.

In the auto lever device, safety locker 30 that is operated by ECU 60 to allow auto lever 1 to move from the P(parking) position when safety button 4 is operated restrains coupling end 6.

In the auto lever device, shift locker 40 that is operated by ECU 60 to allow auto lever 1 to move ahead of the P(parking) when safety button 4 is operated retains coupling end 6 ahead of safety locker 30.

In this state, first start button 10 and second start button 20 are positioned ahead of shift lock position K of shift locker 40.

Safety locker 30 includes a pair of first and second solenoids 32 and 33 that are controlled by ECU 60 and has locking levers 32a and 33a.

Locking levers 32a and 33a are operated by first and second solenoids 32 and 33 and restrain or unlock a locking protrusion 50, such that movement of auto lever 1 is controlled at the P(parking) position.

Shift locker 40 is implemented by a solenoid that is controlled by ECU 60 and has a locking lever 40a.

Locking lever 40a is operated by the solenoid and restrains or unlocks locking protrusion 50, such that movement of auto lever 1 forward from the P(parking) position is controlled.

For this configuration, locking levers 32a, 33a, and 40a of safety locker 30 and shift locker 40 are hinge-coupled to the solenoid to be attached to coupling end 6 of auto lever 1 or detached from coupling end 6.

Locking protrusion 50 is integrally formed with coupling end 6 of auto lever 1, protruding from a side of coupling end 6.

First start button 10 is a pressing type, which generates an electric signal when pressed by a hand, and second start button 20 is a contact type that generates an electric signal by coming in contact with auto lever or a non-contact type that generates an electric signal by sensing the approach position of auto lever 1.

First start button 10 and second start button 20 are implemented in individual structures, respectively, or second start button 20 is integrated with the components of first start button 10.

In the exemplary embodiment, first start button 10 has a button 11 supported by an elastic member 14 wound around a hinge shaft 13 and a PCB panel 15 generating an electric signal by coming in contact with button 11 when button 11 is pressed.

Second start button 20 has a PCB panel 21 disposed inside indicating panel 2 and a PCB 22 connected to PCB panel 21 and equipped with a contact switch 22a and an electric contact point and a signal generating circuit, and a lever protrusion 23 protruding from auto lever 1 to press contact switch 22a.

Second start button 20 may be implemented as a non-contact type having a sensor that generates an electric signal when sensing auto lever 1 approaching within a predetermined distance, instead of contact switch 22a generating an electric signal when pressed.

Second start button 20 can be integrated with first start button 10 by integrating PCB 22 having contact switch 22a with PCB panel 15 of first start button 10.

FIG. 4 is a view showing the configuration of the first start button for start control according to an exemplary embodiment of the present invention.

Figure 4A:
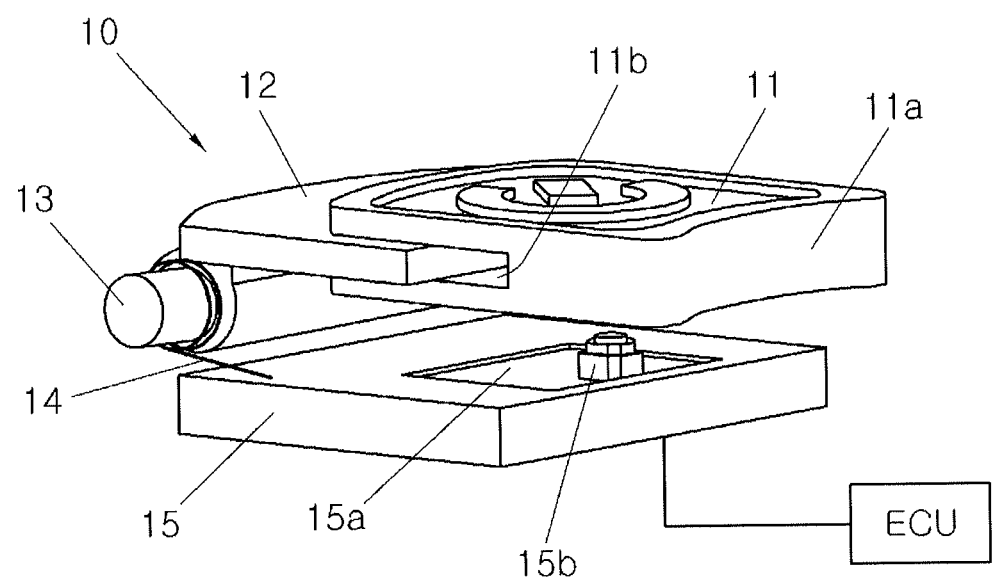
FIG. 4A and FIG. 4B are views showing the configuration of a first start button for start control according to an exemplary embodiment of the present invention.

As shown in FIG. 4A, first start button 10 is implemented by a PCB panel 15 having a PCB (15a) in which button 11 that is pressed by a hand is pressed down about a hinge shaft 13 with both side supported by indicating panel 2, elastic member 14 wound around hinge shaft 13 supports button 11 to apply an elastic restoring force to pressed button 11, and a contact switch 15b generating an electric signal by coming in contact with pressed button 11 protrudes under button 11.

Elastic member 14 is a torsional spring type, which is wound around hinge shaft 13 and of which one side supplies a reacting force to 11 that is pressed and other side is fixed to indicating panel 2 and supports PCB panel 14.

Figure 4B:
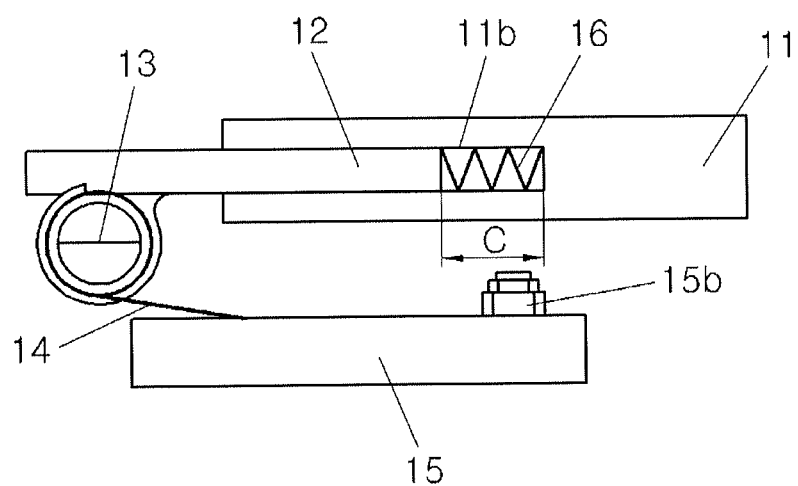

As shown in FIG. 4B, an open slot 11b that is open along the width of button 11 and recessed in a predetermined depth is formed at one end surface of button 11, such that a guider 12 integrally formed with hinge shaft 13 is fitted in open slot 11b and fixed with button 11 by elastic member 16.

Button 11 can be pushed back along guider 12 while compressing elastic member 16 not to interfere with movement of auto lever 1, when pressed by auto lever 1 moving to the operation position of second start button 20 by maintaining a movement gap C where button 11 can be pushed to guider 12.

In the exemplary embodiment, elastic member 16 applies a force to auto lever 1 that has moved forward while returning button 11, which has been pushed, to the initial position.

This operation returns auto lever 1 to the P(parking) position, which is the initial position.

Further, a guide surface 11a (see FIG. 4A) that makes an arc section with the lowermost point at the center position of the width of button 11 is formed on the end surface opposite to button 11.

Accordingly, contact with auto lever 1 moving toward button 11 can be delayed as long as possible, with button 11 inclined at position angle W on the straight movement path of auto lever 1.

Figure 5:
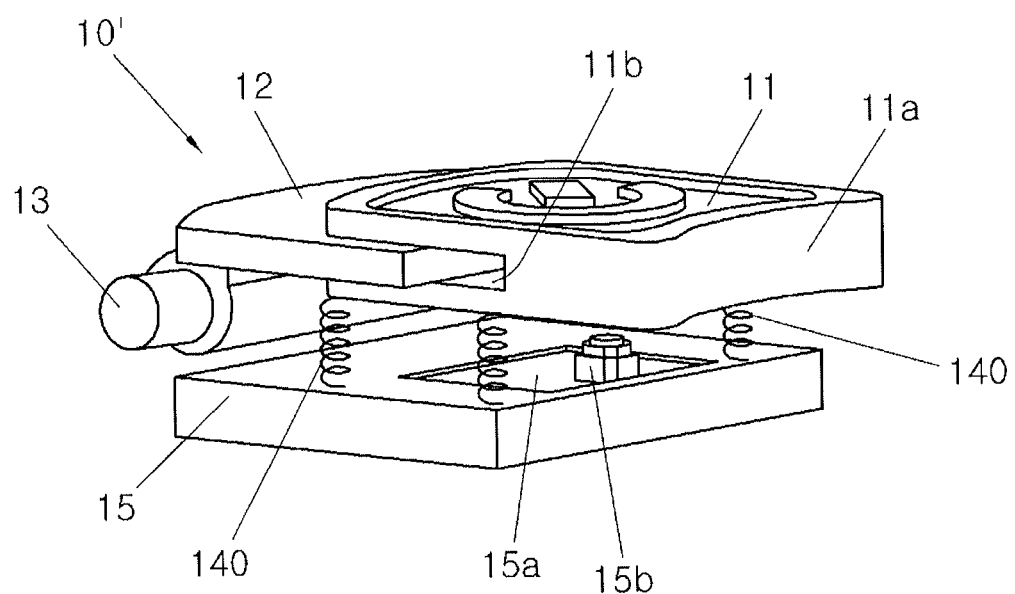
FIG. 5 is a view showing a modified example of the first start button.

FIG. 5 shows a modified example of the first start button according to an exemplary embodiment of the present invention, in which a first start button 10' includes the same components as those of first start button 10, except for an elastic member 140 that provides a return force to pressed button 11 by the elastic force, and implements the same operation.

That is, there is a difference in that torsional spring type elastic member 14 is applied in first start button 10, whereas a coil spring type elastic member 140 is applied in first start button 10'.

At least one or more coil spring type elastic member 140 elastically support button 11 between button 11 and PCB panel 15, such that it provides an elastic force for returning to the initial position when pressed button 11 is released after compressive deformation, such as when button 11 is pressed.

In the exemplary embodiment, in first start buttons 10 and 10', as an electric signal is generated by continuously pressing button 11 that has returned after operating, an operation different from the operation implemented by the previous electric signal is implemented by the electric signal, such that functionality and convenience of first start button 10 can be significantly increased.

A logic that counts and discriminates the generated electric signals is used to discriminate the electric signals generated from first start button 10, which is implemented by ECU 60 or a PIC system controller.

Figure 6B:
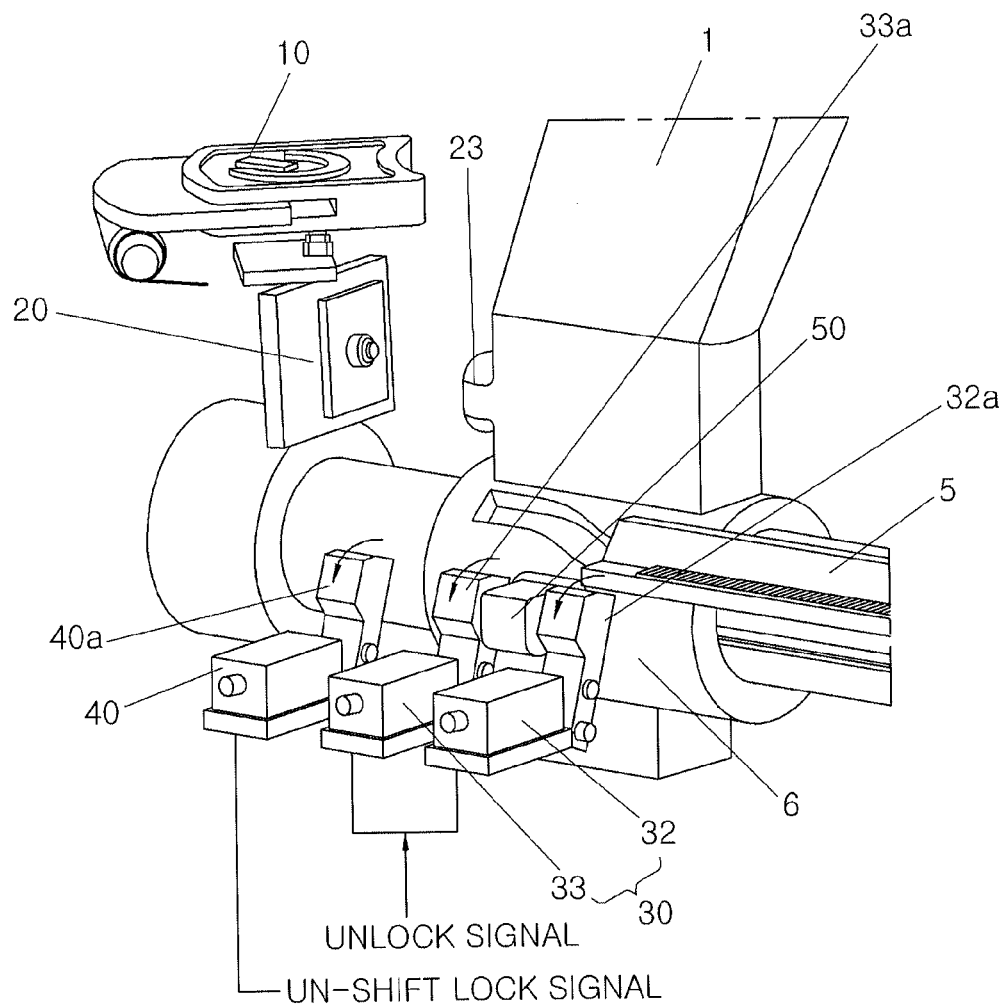

FIG. 6 shows the operational state at the early stage for starting an engine, using the auto lever device.

As shown in FIG. 6, a necessary and sufficient condition for starting an engine is when the vehicle stops and auto lever 1 is positioned at the P(parking) or the N(neutral) of gate pattern 3, with the brake pedal pressed down.

In this state, the engine is started by first start button 10 or second start button 20 in accordance with whether safety button 4 is pressed, such that it is possible to increase the selective width for the driver.

If, first start button 10 is used, safety button 4 and auto lever 1 are not required to operate, such that the driver's selective width is further increased and the convenience is also improved.

However, when second start button 20 is used, it is required to operate safety button 4 and auto lever 1.

Accordingly, in order to use second start button 20, auto lever 1 should be able to be pushed forward from the P(parking) position along lever moving shaft 5.

For this configuration, the driver should unlock auto lever 1 that has been locked by safety locker 30 and shift locker 40 by pressing safety button 4 first to send a signal to ECU 60.

This is because ECU 60 that senses the operation of safety button 4 unlocks locking levers 32a and 33a that has locked locking protrusion 50 by operating first and second solenoids 32 and 33 of safety locker 30, such that auto lever 1 can move from the P(parking) position.

It is also because the solenoid of shift locker 40 is also operated and the anti-movement state of locking protrusion 50 by locking lever 40a is removed, such that auto lever 1 is moved ahead of P(parking) position to come in contact with second start button 20.

FIG. 7A is a view showing when an engine is started by first start button 10, with the vehicle stopped and the engine start condition satisfied, and when the engine is started by first start button 10, the brake pedal should be pressed and auto lever 1 should be at the P(parking) position or the N(neutral) position.

Figure 7B:
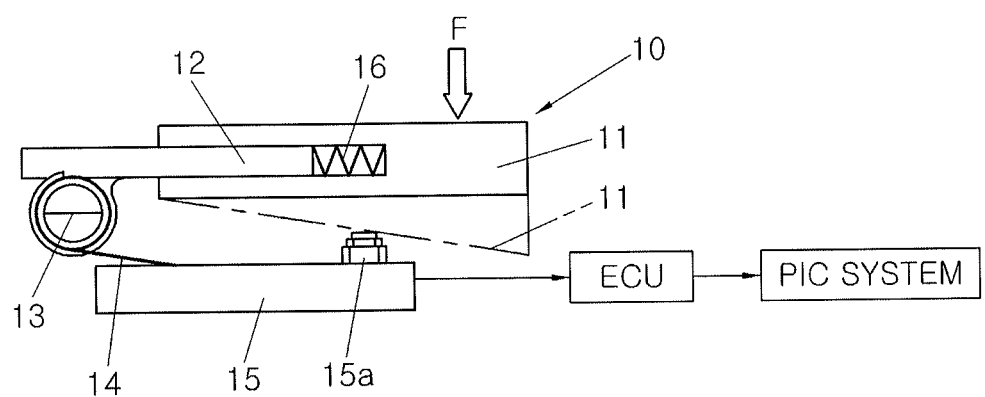
Figure 7C:
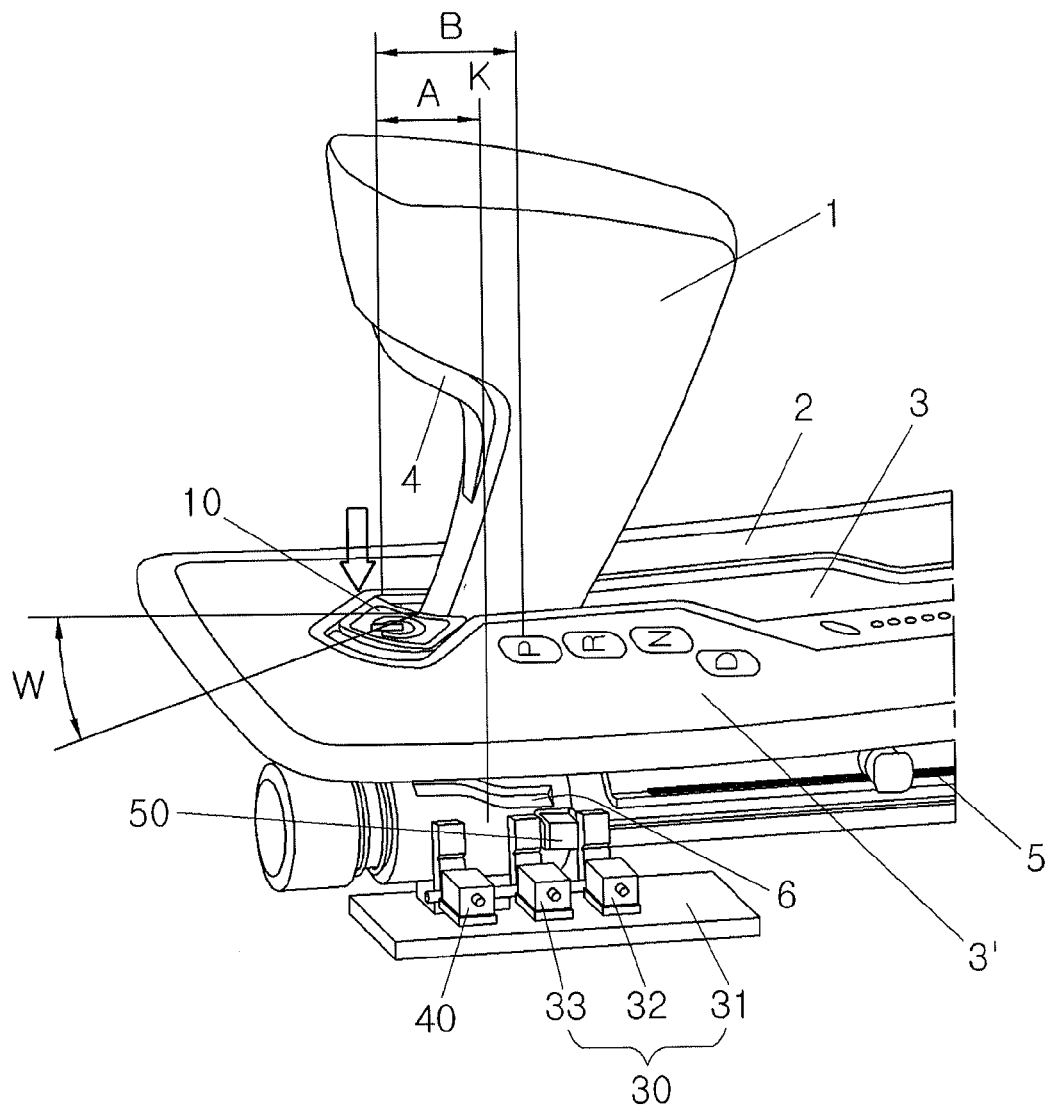

FIG. 7B shows the operation state of the auto lever device when an engine is started by pressing first start button 10, and shown in FIG. 7B, first start button 10 is spaced at the predetermined gap A from shift lock position K of shift locker 40 ahead of the P(parking) position, without being in contact with auto lever 1.

In this state, as first start button 10 is slightly pressed down F, button 11 rotates about hinge shaft 13 while pressing elastic member 14, and moves down toward PCB panel 15.

Thereafter, button 11 that has moved down toward PCB panel 15 presses contact switch 15b, such that an electric signal is generated through PCB 15a.

Therefore, ECU 60 recognizes that first start button 10 has been operated and outputs a signal to the PIC system, such that the engine is started.

Meanwhile, FIG. 8A shows a condition of starting an engine with second start button 20, with the vehicle stopped and a traveling engine start condition satisfied.

When an engine is started by second start button 20 is when the brake pedal is pressed down, auto lever 1 is at the P(parking) position, and safety button 4 of auto lever 1 is pressed.

Figure 8B:
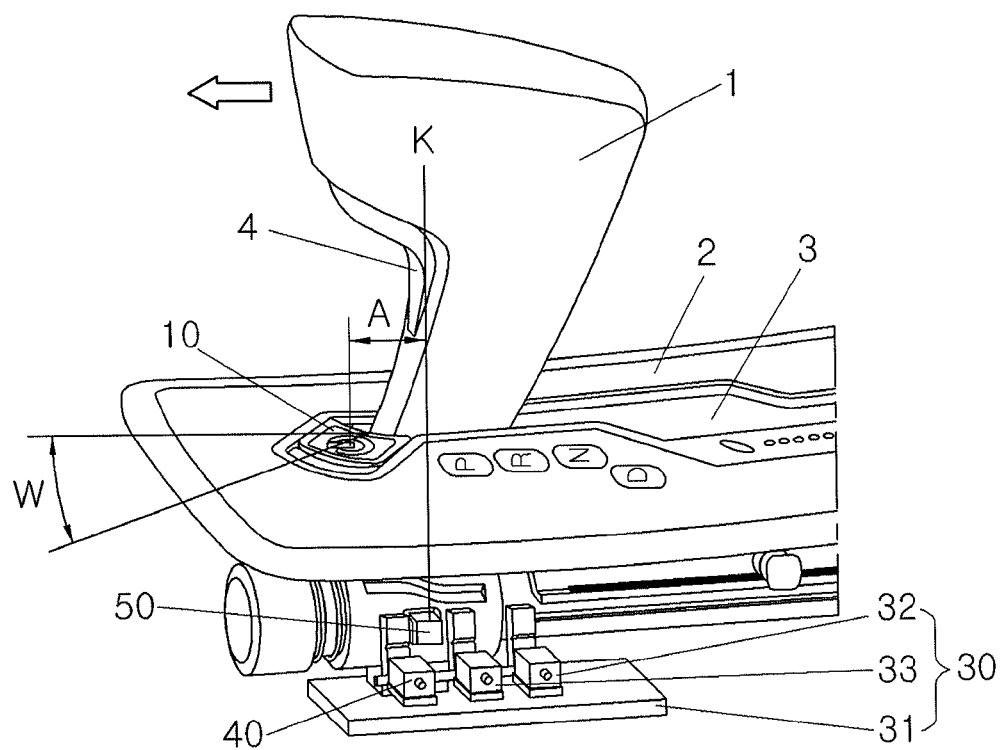
Figure 8C:
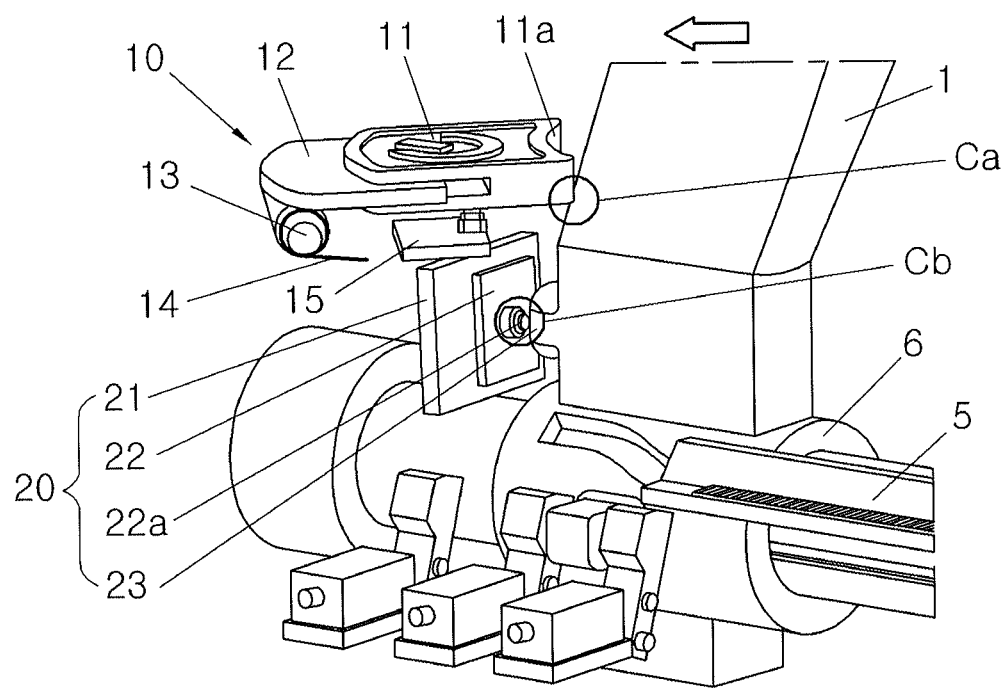

FIG. 8A shows the operation state of the auto lever device when an engine is started by second start button 10, and as shown in FIG. 8B, safety locker 30 and shift locker 40 are unlocked by the operation of safety button 4, such that auto lever 1 can be pushed forward from the P(parking) position along lever moving shaft 5.

As described above, as auto lever 1 is pushed forward from the P(parking) position, with locking protrusion 50 not restrained by shift locker 40, auto lever 1 is moved toward second start button 20 through shift lock position K of shift locker 40.

In this process, auto lever 1 first comes in contact with first start button 10 (Ca) before coming in contact with second start button 20 (Cb), which is because fist start button 10 is closer to auto lever 1 than second start button 20.

Figure 9A:
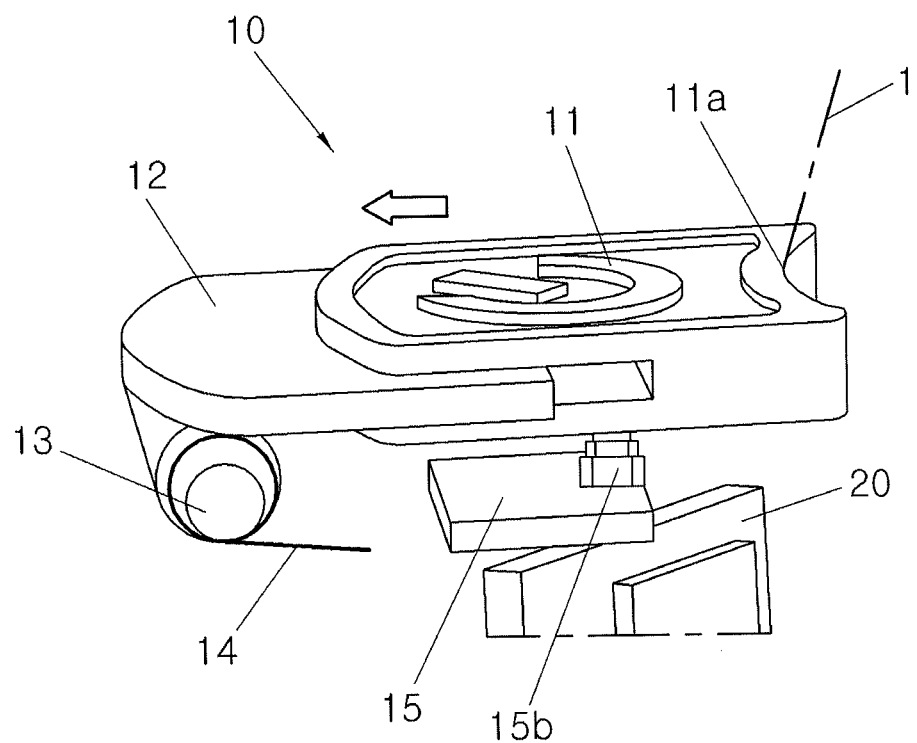
FIG. 9A and FIG. 9B illustrate an operation showing when an engine is started by using a second start button, by pushing an auto lever ahead of the P (parking)-range when the engine start conditions are satisfied.
Figure 9B:
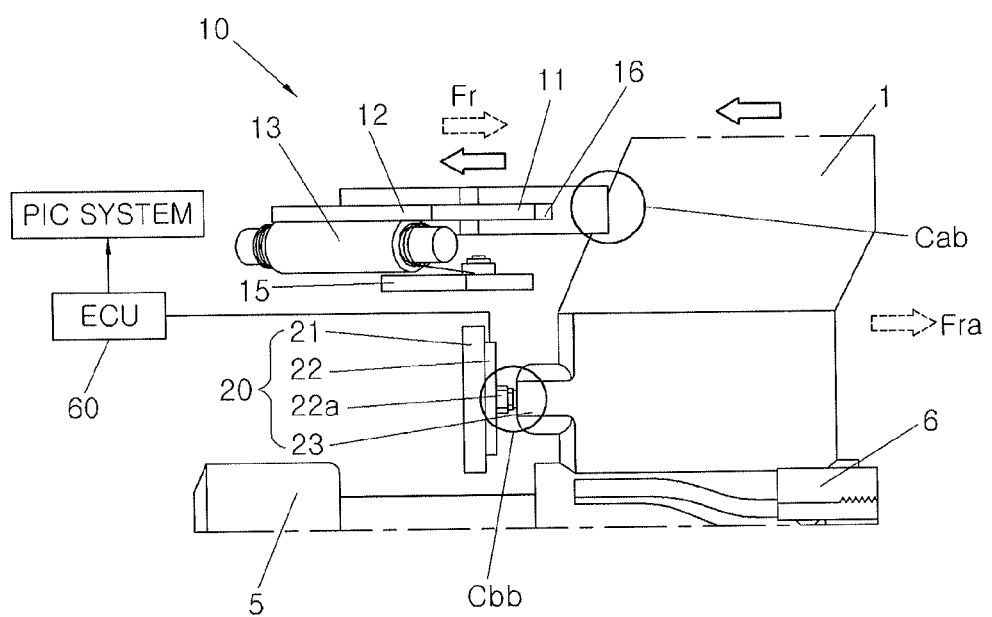

FIG. 9 shows the operation state of first start button 10 by contact with auto lever 1 when auto lever 1 moves.

As shown in FIG. 9, auto lever 1 presses (Cab) button 11 in contact with button 11 of first start button 10 before coming in contact with second start button 20.

Accordingly, button 11 is pushed back by auto lever 1, such that auto lever 1 can press (Cbb) second start button 20.

In this process, auto lever 1 is positioned along guide surface 11a on the arc while pressing (Cab) button 11, which is because button 11 pressed (Cab) by auto lever 1 is pushed back toward guider 12 while compressing elastic member 16.

Therefore, first start button 10 is not able to prevent the movement of auto lever 1 even if it is on the straight movement path of auto lever 1, even with gap A.

As described above, as auto lever 1 moves while pushing forward first start button 10, auto lever 1 presses second start button 10 with lever protrusion 23, such that an electric signal for starting the engine is generated from second start button 10.

That is, as lever protrusion 23 of auto lever 1 presses contact switch 22a, an electric signal is generated through PCB 22, such that ECU 60 recognizes that second start button 20 has operated and outputs a signal to the PIC system, thereby starting the engine.

When the force that the driver applies to auto lever 1 is removed after second start button 20 finishes the operation, button 11 of first start button 10 returns to the initial position by the elastic return force Fr of elastic member 16 that has been compressed.

While button 11 returns to the initial position, auto lever 1 can be pushed back by a return force Fra from button 11.

Figure 10:
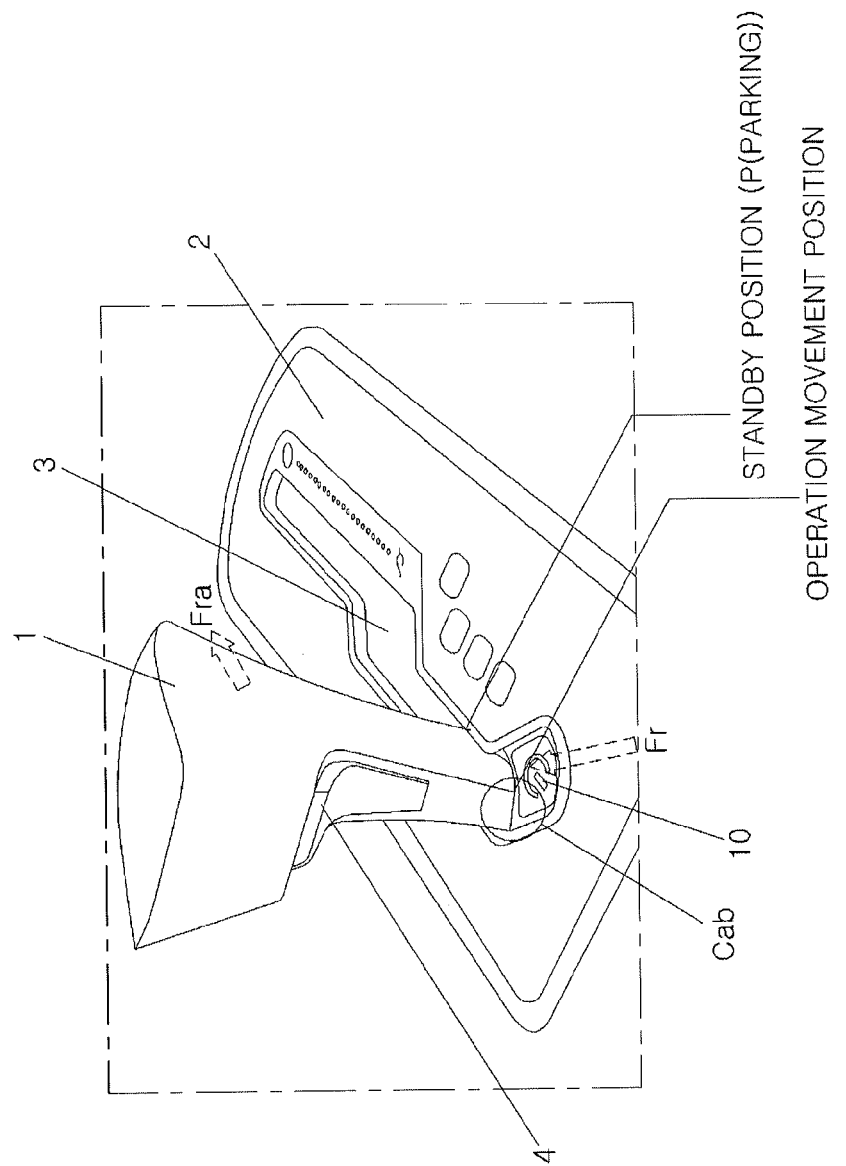
FIG. 10 illustrates an operation showing when an engine is started by using a second start button, by pushing an auto lever ahead of the P (parking)-range when the engine start conditions are satisfied.
Figure 12:
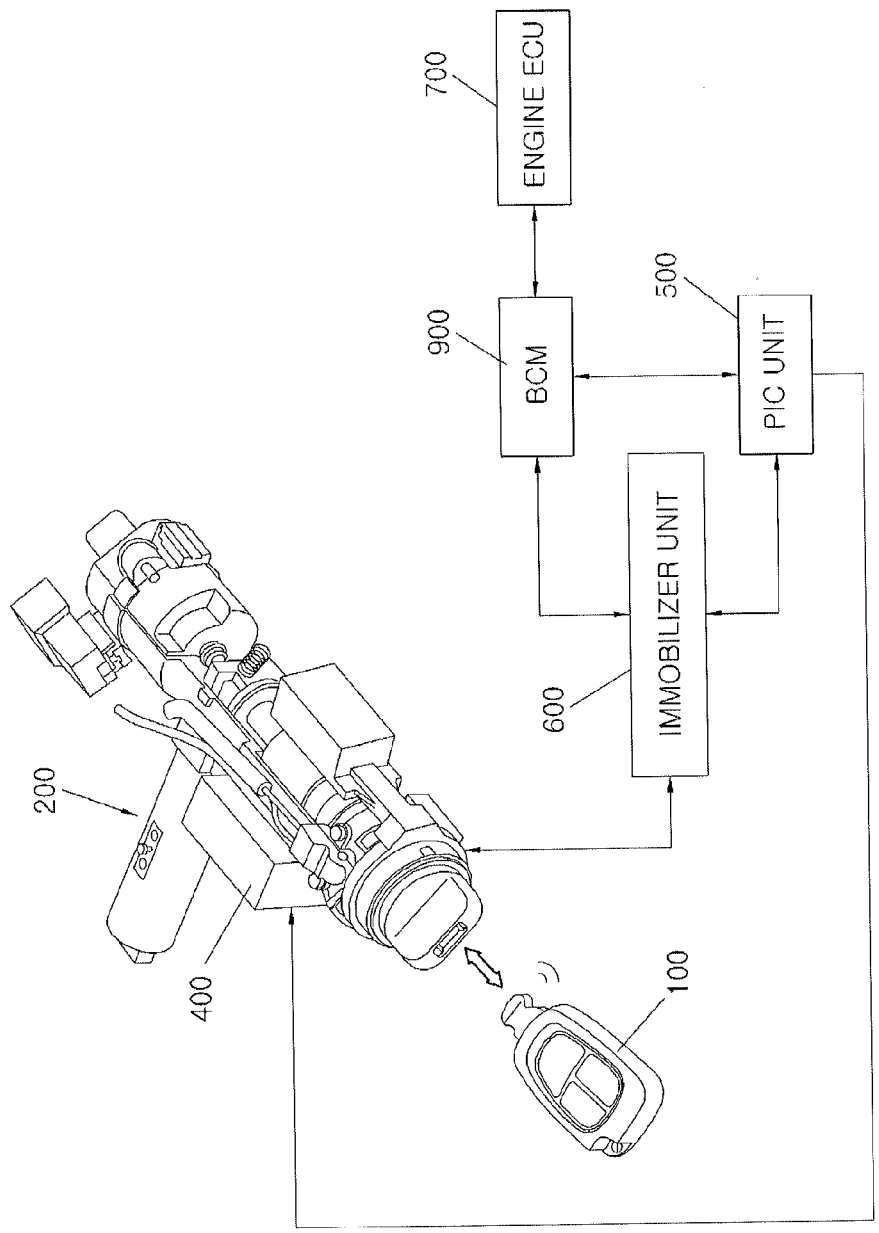
FIG. 12 is a view showing the configuration of a PIC (Personal Identification Card) system provided in a vehicle.

FIG. 10 shows when auto lever 1 is fully moved and pushes first start button 10 to move as far as possible, and as shown in FIG. 10, externally, auto lever 1 is in close contact with guide surface 11a of button 11 while maximally pressing (Cab) button 11 or first start button 10, which means that an engine was started by second start button 20.

As described above, when the driver gets the hand off auto lever 1 in this state, the elastic return force Fr of elastic member 16 that has been compressed by the movement of button 11 is applied to first start button 10, and simultaneously, return force Fra is also applied to auto lever 1.

Accordingly, button 11 is returned to the initial position by elastic return force Fr of elastic member 16, such that first start button 10 returns to the state before the operation while auto lever is pushed back from the operation movement position to a standby position [P(parking)], which is the initial state.

In the exemplary embodiment, as described above, in all the cases when auto lever 1 is moved ahead of the P(parking), when the hand is got off auto lever 1, auto lever 1 receives the elastic return force Fr supplied from first start button 10 and is pushed back to the standby position [P(parking)], which is the initial state before the operation, such that the state where the operation is possible by the driver is implemented.

In the returned state of auto lever 1, when second start button 20 generates again an electric signal by pushing auto lever 1 again due to a continuous action, the electric signal implements action different from the action implemented by the previous electric signal, such that the functionality and convenience of second start button 20 can be considerably improved, as in first start button 10, which was described above.

A logic that counts and discriminates the generated electric signals is used to discriminate the electric signals generated from second start button 20, which is implemented by ECU 60 or a PIC system controller.

FIG. 11 is a view showing control of engine start-off and vehicle power-on/off which can be implemented by the first start button and the second start button provided in the auto lever device according to an exemplary embodiment of the present invention.

For example, when an engine start-off state is implemented with first start button 10 or second start button 20, with the vehicle stopped or traveling under a predetermined speed and the brake pedal not pressed down, different engine start-off result can be achieved, in accordance with the shift range position of auto lever 1 and whether safety button 4 operates.

That is, in the initial condition described above, when auto lever 1 is placed at the P(parking) position and auto lever 1, which has been pushed back from the unlock state by the operation of safety button 4, presses second start button 20, the engine start-off state is directly implemented, whereas when first start button 10 is pressed without pressing down the brake pedal with auto lever 1 at the D(drive)/R(rear)/N(neutral) positions under the same condition, an ACC state can be implemented.

The ACC means a state when the engine is not started and battery power is supplied to the electronic devices in the vehicle.

As another example, when the power is turned on with first start button 10 or second start button 20, with the vehicle stopped and the brake pedal not pressed down, different power-on results can be achieved, in accordance with the shift range position of auto lever 1 and whether safety button 4 operates.

That is, in the initial condition described above, when auto lever 1 is placed at the P(parking) position and auto lever 1, which has been pushed back from the unlock state by the operation of safety button 4, presses second start button 20 or first start button 10 is pressed under the same condition, the results by second start button 20 and first start buttons 10 are the same.

In this case, electric signals are continuously generated from second start button 20 and first start button 10 and counted, such that an example of implementing various functions is achieved.

For example, the conversion of OFF→ACC is a case when first start button 10 is pressed one time or second start button 20 operates one time to auto lever 1, in which the ACC state where power is turned off or supplied to the electronic devices in the vehicle is implemented.

The conversion of ACC→ON means when an ON-state where the engine is started is implemented, as first start button 10 is continuously pressed again or second start button 20 operates again to auto lever 1, after first start button 10 and auto lever 1 return from the OFF→ACC state.

The conversion of ON→OFF means when an OFF-state where the engine is stopped and the power is turned off is implemented, as first start button 10 is continuously pressed once again or second start button 20 operates once again to auto lever 1, after first start button 10 and auto lever 1 return from the ACC→ON state.

However, the ACC state can be achieved by placing auto lever 1 at the D(drive)/R(rear)/N(neutral) position and pressing first start button 10 in the initial condition described above.

The ACC means a state when the engine is not started and battery power is supplied to the electronic devices in the vehicle.

As another example, when a power-off state is implemented with first start button 10 or second start button 20, with the vehicle stopped or traveling under a predetermined speed and the brake pedal not pressed down, different power-off results can be achieved, in accordance with the shift range position of auto lever 1 and whether safety button 4 operates.

That is, in the initial condition described above, when auto lever 1 is placed at the P(parking) position, auto lever 1 is unlocked by operating safety button 4, and second start button 20 is pressed by auto lever 1 or first start button 10 is pressed, the results by second start button 20 and first start buttons 10 are the power-off state, in the same way.

However, the ACC state can be achieved by placing auto lever 1 at the D(drive)/R(rear)/N(neutral) positions and pressing first start button 10 in the initial condition described above.

The ACC means a state when the engine is not started and battery power is supplied to the electronic devices in the vehicle.

In the auto lever device according to the exemplary embodiment, as described above, when the engine start-on condition where the auto lever is positioned at the P(parking) or N(neutral) and the brake pedal is pressed down or the engine start-off condition where the auto lever is positioned at the P(parking) or the D(drive)/R(rear)/N(neutral) is satisfied, auto lever 1 unlocked from safety locker 30 and shift locker 40 presses second start button 20 positioned ahead of the P(parking) by directly pressing first start button 10 positioned ahead of the P(parking) or operating safety button 4, such that an electric signal is sent to the PIC system.

Therefore, the driver has only to press the start buttons with a finger or push auto lever 1 within the range where the driver's intuitive action line is ensured in order to start or stop the engine, thus implementing convenience requiring only the minimum action.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An ignition control type auto lever device, comprising:
a gate pattern;
an auto lever, movement of which generates control signals, wherein shift mode control signals for P(parking)-R(rear)-N(neutral)-D(drive) are generated by the movement of the auto lever according to the gate pattern, and another mode control signal is generated by the movement of the auto lever to a section behind the D(drive); and
a start control unit sending electric signals generated by at least one or more different operations of the auto lever at a section positioned ahead of the P(parking) position to a PIC (Personal Identification Card) system.

2. The ignition control type auto lever device as defined in claim 1, wherein the electric signals are an engine start-on/off electric signal and a vehicle power-on/off electric signal.

3. The ignition control type auto lever device as defined in claim 1, wherein the electric signals are generated by a driver moving forward the auto lever ahead of the P(parking) position or directly pressing the portion around the gate pattern at the section positioned ahead of the P(parking).

4. The ignition control type auto lever device as defined in claim 3, wherein the electric signals are an engine start-on/off electric signal and a vehicle power-on/off electric signal.

5. An ignition control type auto lever device, comprising:
a gate pattern;
an auto lever, movement of which generates control signals, wherein shift mode control signals for P(parking)-R(rear)-N(neutral)-D(drive) are generated by the movement of the auto lever according to the gate pattern, and another mode control signal is generated by the movement of the auto lever to a section behind the D(drive);
a start control unit sending electric signals generated by at least one or more different operations of the auto lever at a section positioned ahead of the P(parking) position to a PIC (Personal Identification Card) system;
a first start button that is exposed to the outside of an indicating panel provided with the gate pattern and disposed around the gate pattern at the section positioned ahead of the P(parking), wherein a first electrical signal is generated by the first start button when the driver presses the first start button; and
a second start button that is disposed inside the indicating panel in order not to be exposed to the outside wherein a second electrical signal is generated by the second start button when the auto lever actuates the second start button.

6. The ignition control type auto lever device as defined in claim 5, wherein the first and second electric signals are an engine start-on/off electric signal or a vehicle power-on/off electric signal.

7. The ignition control type auto lever device as defined in claim 5, wherein the first start button includes:
a Printed Circuit Board (PCB) panel and a contact switch electrically connected to the PCB panel;
a button that selectively moves down about a hinge shaft coupled to the indicating panel when pressed down and receives an elastic restoring force from a torsional spring wound around the hinge shaft so as to selectively contact with the contact switch of the PCB panel and generate the first electric signal when pressed by the button that has moved down; and
a guider slidably coupled to an open slot formed to the button and guiding a forward-backward movement of the button when the button is pushed by the driver, wherein a return spring is disposed between the guider and the button in the open slot to provide an elastic restoring force for return, to the button and the auto lever,
wherein the second start button includes:
a contact switch;
a PCB panel disposed inside the indicating panel and having the contact switch that protrudes toward the auto lever and generates the second electric signal when pressed by the auto lever, and
wherein the auto lever has:
a safety locker and a shift locker that restrain the forward-backward movement of the auto lever at the P(parking) position at the portion of the auto lever coupled to a lever moving shaft that guides the forward-backward movement of the auto lever;
a safety button that sends an unlock signal to the safety locker and the shift locker restraining movement toward the section positioned ahead of the P(parking); and
a lever protrusion formed to the auto lever and installed to press the contact switch of the second start button when the auto lever moves ahead of the P(parking).

8. The ignition control type auto lever device as defined in claim 7,
wherein the safety locker and the shift locker include solenoids that are operated in response to signals of the safety button, and
wherein the solenoid of the safety locker has a locking lever that locks/unlocks a locking protrusion that protrudes from an outer surface of the auto lever coupled with the lever movement shaft; and
wherein the solenoid of the shift locker has a locking lever disposed in front of the auto lever to selectively allow the movement of the auto lever forward from the P (parking) position thereof.

9. The ignition control type auto lever device as defined in claim 5, wherein the first start button includes:
a Printed Circuit Board (PCB) panel and a contact switch electrically connected to the PCB panel;
a button that selectively moves down about a hinge shaft coupled to the indicating panel when pressed down and receives an elastic restoring force from a spring disposed between the PCB panel and the button so that the pressed button of the first start button receives an elastic restoring force from the spring elastically and vertically supporting the portion between the PCB panel and the button;
a guider slidably coupled to an open slot formed to the button and guiding a forward-backward movement of the button when the button is pushed by the driver, wherein a return spring is disposed between the guider and the button in the open slot to provide an elastic restoring force for return, to the button and the auto lever,
wherein the second start button includes:
a contact switch that generates a second electric signal, using a sensor that senses the distance from the auto lever.

10. The ignition control type auto lever device as defined in claim 9,
wherein the safety locker and the shift locker include solenoids that are operated in response to signals of the safety button, and wherein the solenoid of the safety locker has a locking lever that locks/unlocks a locking protrusion that protrudes from an outer surface of the auto lever coupled with the lever movement shaft; and wherein the solenoid of the shift locker has a locking lever disposed in front of the auto lever to selectively allow the movement of the auto lever forward from the P (parking) position thereof.

11. The ignition control type auto lever device as defined in claim 7, wherein the first button is integrated with the second start button by the PCB panel of the first start button.

12. The ignition control type auto lever device as defined in claim 9, wherein the first button is integrated with the second start button by the PCB panel of the first start button.

13. The ignition control type auto lever device as defined in claim 5, wherein the first start button is exposed to the outside of the indicating panel at a position where the first start button first comes in contact with the auto lever before the second start button comes in contact with the auto lever when the auto lever moves toward the first start button.

14. The ignition control type auto lever device as defined in claim 13, wherein continuous generation of the first and second electric signals of the first start button and the second start button is discriminated by counting in the PIC system.

15. The ignition control type auto lever device as defined in claim 6, wherein conditions for recognizing the first and second electric signals of the first start button and the second start button in the PIC system are an engine start-on condition when a vehicle stops, the auto lever is positioned at the P(parking) or the N(neutral), and a brake pedal is pressed down, and wherein conditions for recognizing the first and second electric signals of the first start button and the second start button in the PIC system are an engine start-off condition when the vehicle stops or travels under a predetermined speed, the auto lever is positioned at the P(parking) or the D(drive)/R(rear)/N(neutral), and the brake pedal is not pressed down.

16. The ignition control type auto lever device as defined in claim 6, wherein conditions for recognizing the first and second electric signals of the first start button and the second start button in the PIC system are a vehicle power-on condition when a vehicle stops, the brake pedal is not pressed down, and the auto lever is placed at the P(parking) position or the D(drive)/R(rear)/N(neutral) positions, and wherein conditions for recognizing the first and second electric signals of the first start button and the second start button in the PIC system are a vehicle power-off state when the vehicle stops or travels under a predetermined speed, the brake pedal is not pressed down, and the auto lever is placed at the P(parking) position or the D(drive)/R(rear)/N(neutral) positions.

* * * * *